United States Patent
Rajaram et al.

(10) Patent No.: US 8,402,069 B2
(45) Date of Patent: Mar. 19, 2013

(54) USE OF DELETE NOTIFICATIONS BY FILE SYSTEMS AND APPLICATIONS TO RELEASE STORAGE SPACE

(75) Inventors: Senthil Rajaram, Seattle, WA (US); Andrew Herron, Redmond, WA (US); Daniel W. H. Chan, Redmond, WA (US); Ravinder S. Thind, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 567 days.

(21) Appl. No.: 12/435,229

(22) Filed: May 4, 2009

(65) Prior Publication Data

US 2010/0281080 A1   Nov. 4, 2010

(51) Int. Cl.
G06F 17/00 (2006.01)
(52) U.S. Cl. ......... 707/821; 707/702; 707/813; 711/206
(58) Field of Classification Search .................. 707/821, 707/702, 813; 711/206
See application file for complete search history.

(56) References Cited

U.S. PATENT DOCUMENTS

| | | | | |
|---|---|---|---|---|
| 5,287,504 A * | 2/1994 | Carpenter et al. | | 707/702 |
| 6,119,214 A * | 9/2000 | Dirks | | 711/206 |
| 6,507,911 B1 | 1/2003 | Langford | | |
| 6,604,127 B2 | 8/2003 | Murphy et al. | | |
| 6,633,959 B2 | 10/2003 | Arimilli et al. | | |
| 6,820,122 B1 | 11/2004 | Mandler et al. | | |
| 6,877,018 B2 * | 4/2005 | Oshins et al. | | 1/1 |
| 7,299,232 B2 | 11/2007 | Stakutis et al. | | |
| 2002/0059245 A1 * | 5/2002 | Zakharov et al. | | 707/10 |
| 2003/0163661 A1 | 8/2003 | Marion et al. | | |
| 2007/0118559 A1 * | 5/2007 | Christiansen et al. | | 707/104.1 |
| 2007/0282868 A1 | 12/2007 | Wanigasekara-Mohotti et al. | | |
| 2008/0177805 A1 * | 7/2008 | Kushwah et al. | | 707/203 |
| 2008/0263305 A1 | 10/2008 | Shu et al. | | |
| 2009/0254517 A1 * | 10/2009 | Dalton | | 707/2 |
| 2010/0125588 A1 | 5/2010 | Mehra | | |
| 2010/0125705 A1 | 5/2010 | Mehra | | |
| 2010/0125714 A1 | 5/2010 | Mehra | | |

OTHER PUBLICATIONS

Oracle Database Concepts 10g Release 1 (10.1)", Retrieved at <<http://www.sc.ehu.es/siwebso/KZCC/Oracle_10g_Documentacion/server.101/b10743/mgmt_db.htm#BDCDHAAC>>, Feb. 12, 2009, pp. 1-28.
Aguilera, et al., "Building Distributed Applications Using Sinfonia", Retrieved at <<http://www.hpl.hp.com/techreports/2006/HPL-2006-147.pdf>>, Oct. 18, 2006, pp. 16.
Jauhari, Nikesh, "Linux Filesystem Event Notification Using Inotify", Retrieved at <<http://linuxpoison.blogspot.com/2009/01/linux-filesystem-event-notification.html>>, Jan. 13, 2009, pp. 1-3.

* cited by examiner

*Primary Examiner* — Belix M Ortiz Ditren
(74) *Attorney, Agent, or Firm* — Wolfe-SBMC

(57) ABSTRACT

In accordance with one or more aspects, one or more portions of each of multiple files that have been freed are determined. One or more delete notifications are generated identifying the one or more portions of the multiple files. Each portion is identified as a range of data on a storage device, and each delete notification includes one or more ranges of data on the storage device. These generated delete notifications are then sent to a storage stack. Additionally, an application can determine that one or more ranges of data of a storage device are to be freed and send a delete notification, in the absence of a file system on the device, to the storage stack identifying the one or more ranges of data of the storage device that are to be freed.

20 Claims, 8 Drawing Sheets

USE OF DELETE NOTIFICATIONS BY FILE SYSTEMS AND APPLICATIONS TO RELEASE STORAGE SPACE

BACKGROUND

Computing devices typically store data and instructions in files on a storage device, such as a hard disk drive, optical disc drive, solid state memory, and so forth. A file system typically interacts with the storage device to create, delete, and/or modify files. This interaction can be direct, or indirect through one or more intermediate components. Oftentimes, when the file system deletes a file it does not communicate the details of the space freed due to the delete operation, in which case the storage device and any intermediate components have no knowledge of the space being freed. This manner of deleting files can be problematic as the storage device and any intermediate components oftentimes have no knowledge of which portions of the storage device do and do not store data for valid files.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, one or more portions of each of multiple files that have been freed are determined. One or more delete notifications are generated identifying the one or more portions of the multiple files. Each portion is identified as a range of data on a storage device, and each delete notification includes one or more ranges of data on the storage device. These generated delete notifications are then sent to a storage stack.

In accordance with one or more aspects, a determination is made in a device of one or more ranges of data of a storage device that are to be freed. In the absence of a file system on the device, a delete notification is sent to a storage stack identifying the one or more ranges of data of the storage device that are to be freed.

BRIEF DESCRIPTION OF THE DRAWINGS

The same numbers are used throughout the drawings to reference like features.

DETAILED DESCRIPTION

The use of delete notifications by file systems and applications to release storage space is discussed herein. A storage device has a corresponding storage stack that includes multiple components, such as filters. A file system as well as other applications that manage their own storage can access the storage device via this storage stack. This access can include sending delete notifications to the storage device via the storage stack that notify the storage device as well as the components of the stack of a portion of a storage device that is no longer occupied by a file (or portion of a file). Delete notifications can be sent to the stack individually or alternatively multiple delete notifications can be grouped and sent to the stack together. Additionally, when the file system or an application sends a delete notification indicating a portion of the storage device is no longer in use, the file system or application waits until it has received confirmation from the stack that the portion of the storage device has been released before re-using that area of the storage device.

Figure 1:
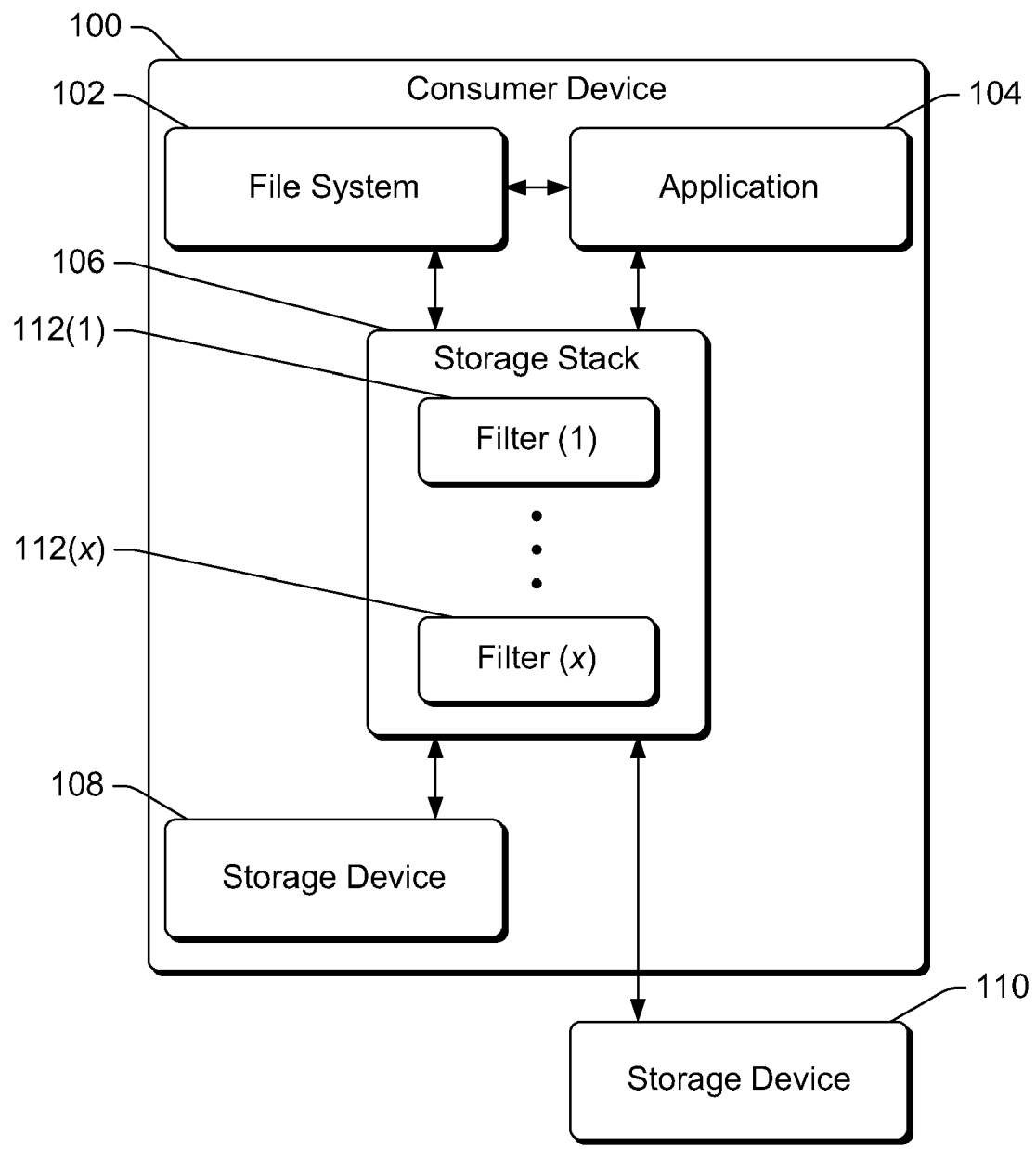
FIG. 1 is a block diagram illustrating an example consumer device implementing the use of delete notifications by file systems and applications to release storage space in accordance with one or more embodiments.

FIG. 1 is a block diagram illustrating an example consumer device 100 implementing the use of delete notifications by file systems and applications to release storage space in accordance with one or more embodiments. Consumer device 100 can be a variety of different devices capable of running applications that access a storage device. For example, consumer device 100 can be a desktop computer, a portable computer, a mobile station, an entertainment appliance, a set-top box communicatively coupled to a display device, a television, a cellular or other wireless phone, a game console, an automotive computer, and so forth. Thus, consumer device 100 may range from a full resource device with substantial memory and processor resources (e.g., personal computers, game consoles) to a low-resource device with limited memory and/or processing resources (e.g., traditional set-top boxes, handheld game consoles).

Consumer device 100 includes a file system 102, an application 104, a storage stack 106, and a storage device 108. Consumer device 100 can also be coupled to another storage device 110. Storage device 108 is included as part of computing device 100, and can be a fixed or removable storage device. Storage device 110 is separate from consumer device 100, and can be a local device coupled to consumer device 100 using a variety of different wired or wireless techniques (e.g., Universal Serial Bus (USB) coupling, wireless USB coupling, IEEE 1394 coupling, infrared (IR) coupling, and so forth. Storage device 110 can also be a remote device coupled to consumer device 100 via a network, the Internet, a local area network (LAN), a telephone network, an intranet, other public and/or proprietary networks, and so forth. Each of storage devices 108 and 110 can be a variety of different storage devices, such as magnetic disks, optical discs, solid state memory (e.g., Flash memory), and so forth.

File system 102 and application 104 are both programs or program modules that are typically implemented in software and/or firmware. These programs or program modules are executed by one or more processing units (not shown in FIG. 1) of consumer device 100 to carry out the functionality of the programs or program modules. File system 102 and application 104 can interact with storage devices 108 and 110 via storage stack 106.

Storage stack 106 is typically implemented in software, firmware, and/or hardware, and includes one or more (x) filters 112. Each filter 112 is a component situated between a program or program module (e.g., file system 102 or application 104), and a physical storage medium in a storage device (e.g., device 108 or 110). Each filter 112 can receive and pass on read and/or write requests, and optionally provide additional functionality. Each of these filters 112 can provide a variety of different functionality. For example, a filter 112 can be a snapshot filter that manages snapshots of a volume. By way of another example, a filter 112 can be a write aggregation filter that aggregates data to be written to primary locations in one or more storage devices in a set of lazy writes (e.g., writes that are delayed until an idle or less busy time). By way of yet another example, a filter 112 can be a disk verification filter that produces checksums of data as the data is written to a storage device. The disk verification filter can also compare those checksums with checksums of the same data as the data is read from the storage device, thereby verifying the integrity of the data being read. By way of a further example, a filter 112 can be a performance-boosting filter that caches data on some alternative storage media, such as RAM, a USB storage device, or flash media, that is faster than a main storage media. This cached data can be used to enhance computer performance, such as to more quickly boot a consumer device 100.

Different filters 112 can be grouped together, allowing storage stack 106 to be viewed as having multiple different portions or alternatively as being multiple different stacks. For example, storage stack 106 may include a first portion that represents storage areas in terms of storage device addresses (e.g., using logical block addressing or cylinder-head-sector addressing). On top of the first portion can be a second portion that is a volume stack that represents storage areas in terms of locations in one or more logical disks or volumes.

In one or more embodiments, file system 102 and storage stack 106 are both part of an operating system of consumer device 100. Alternatively, storage stack 106 can be implemented in other manners. For example, one or more filters 112 of storage stack 106 could be implemented as part of storage device 108 and/or 110.

File system 102 manages files stored on storage devices 108 and/or 110 on behalf of other applications running on consumer device 100. Oftentimes, applications are designed to interact with file system 102 to create, delete, and/or modify files on storage devices 108 and/or 110. Thus, rather than interacting with storage stack 106 directly, such applications interact with file system 102 which in turn interacts with storage stack 106. Typically a consumer device 100 has a single file system 102, although alternatively consumer device 100 can have multiple file systems.

Application 104, on the other hand, manages its own storage. Thus, application 104 can direct the creation, deletion and/or modification of files on storage devices 108 and/or 110. Application 104 can be a variety of different applications, such as a database application, an application responsible for formatting storage devices, an application responsible for repositioning data on or otherwise managing storage devices, and so forth. Although a single application 104 is illustrated in FIG. 1, it is to be appreciated that multiple applications can be included on consumer device 100, each such application managing its own storage.

In one or more embodiments, application 104 interacts with storage stack 106 directly to create, delete and/or modify files on storage devices 108 and/or 110. In such embodiments, no file system 102 is typically present on consumer device 100. Alternatively, if file system 102 is present on consumer device 100 then file system 102 is bypassed by application 104. In such situations, different sections of storage devices 108 and/or 110 can be partitioned for use by application 104, while other sections are for use by file system 102.

In other embodiments, application 104 interacts with storage stack 106 via file system 102. In such embodiments, application 104 can still direct the creation, deletion and/or modification of files on storage devices 108 and/or 110. However, requests to create, delete, and/or modify files are passed through file system 102 in such embodiments.

Both file system 102 and application 104 can send read and/or write requests as well as delete notifications to storage stack 106. Application 104 can pass such read and/or write requests and delete notifications to storage stack via file system 102, or alternatively interact with storage stack 106 directly as discussed above.

A read request can be passed down storage stack 106 to storage device 108 or 110 to have particular data read from the storage device. Similarly, a write request can be passed down storage stack 106 to storage device 108 or 110 to have particular data written to the storage device.

A delete notification is an indication that a portion or portions of a storage device is no longer occupied by a file (or portion of a file). Each portion of a storage device that is no longer occupied by a file (or portion of a file) is referred to as a freed range of data on the storage device. The delete notification indicates to filters 112 that the range of data is no longer occupied by a file (or portion of a file), and thus that the range of data can be freed or otherwise released. The delete notification can identify the freed range of data in a variety of different manners, such as specifying a particular data range by starting point and length, specifying a particular data range by beginning and ending, specifying particular blocks or sectors, and so forth.

Additionally, the filters 112 in storage stack 106 can be viewed as being stacked on top of one another, so that filter 112(1) receives delete notifications from file system 102 or application 104 and can pass those delete notifications to filter 112(2), filter 112(2) in turn receives delete notifications form filter 112(1) and can pass those delete notifications to filter 112(3), and so forth. Each filter 112 can receive a delete notification, process the delete notification, and forward on the delete notification to the next filter 112 in storage stack 106. The processing of a delete notification by a filter 112 can include modifying the delete notification (such as by increasing, decreasing, or otherwise changing one or more portions or ranges of data that the delete notification identifies), creating one or more new delete notifications, performing a particular function or action in response to the delete notification, and so forth.

It should be noted that file system 102, application 104, and/or one or more filters 112 can optionally maintain various metadata corresponding to the freed range of data identified in a delete notification. The specific metadata maintained can vary based on the particular file system 102, application 104, and/or filter 112 as well as the desires of the developer of the particular file system, application, and/or filter. Such metadata is flushed or otherwise deleted by the file system 102, application 104, and/or filter 112 before sending or passing on the delete notification.

Similarly, information (such as confirmations discussed below) can be passed back up storage stack 106. For example, filter 112($x$) can receive a confirmation or can generate a confirmation that it passes up to filter 112($x$-1), filter 112($x$-1) in turn receives the confirmation from filter 112($x$) and passes the confirmation up to filter 112($x$-2), and so forth.

File system 102 and application 104 can each send delete notifications to storage stack 106 individually, or alternatively multiple delete notifications can be grouped and sent to storage stack 106 together. In situations where delete notifications are sent to storage stack 106 individually, when file system 102 or application 104 determines that one or more portions of a storage device are no longer occupied by a file or portion of a file, a delete notification is sent to storage stack 106 identifying each of those one or more portions as a freed range of data. Each delete notification can identify one or multiple freed ranges of data. File system 102 and application 104 do not wait until they have determined that one or more other delete notifications are to be sent to storage stack 106.

In situations where multiple delete notifications are sent to storage stack 106 grouped together, file system 102 and application 104 each group together multiple delete notifications and send those multiple delete notifications together to storage stack 106. Each of these multiple delete notifications that are grouped together can identify one or multiple freed ranges of data. This grouped together notification can be, for example, a single message or packet that includes or otherwise identifies the multiple delete notifications. The determination of when the multiple delete notifications are to be sent can be made in a variety of different manners. For example, file system 102 and application 104 can determine that the multiple delete notifications grouped together are to be sent at regular intervals (e.g., every 30 seconds), during periods of inactivity or low usage of storage devices 108 and 110 by file system 102 or application 104, after a particular number of delete notifications have been grouped together, after a particular number of freed ranges of data have been identified in the delete notifications that have been grouped together, and so forth.

Application 104 can interact with storage devices 108 and 110 via storage stack 106, by way of file system 102 or directly as discussed above. As application 104 manages its own storage, in one or more embodiments application 104 need not send delete notifications to file system 102. Alternatively, application 104 can notify file system 102 of the delete notifications that application 104 sends to storage stack 106, allowing file system 102 to know which portions of the storage devices 108 and 110 are being used and managed by application 104.

In one or more embodiments, storage stack 106 or file system 102 exposes an application programming interface (API) that can be invoked by application 104. This API exposes a delete method that allows application 104 to identify one or more ranges of data of a storage device that are to be freed. This delete method can be invoked by application 104 to send a delete notification to storage stack 106 directly or via file system 102. For example, the delete method of the API can have as parameters a file handle, an offset value, and a length value. The file handle is an identifier of the particular file for which the one or more portions are to be freed. The offset value indicates an offset into the file (e.g., a number of bytes or blocks from the beginning of the file) that is the beginning of the one or more portions that are to be freed. The length value indicates an amount of the file (e.g., a number of bytes or blocks) that are to be freed beginning at the location in the file identified by the offset value.

It is to be appreciated that this delete method is an example of a delete method, and that various modifications can be made. For example, multiple offset and length value pairs can be included to identify multiple ranges of data of a storage device to be freed. By way of another example, rather than an offset value and a length value, a beginning offset value and an ending offset value can be used to indicate that the range of data between the beginning offset value and the ending offset value is to be freed.

When file system 102 or application 104 sends a delete notification to storage stack 106 identifying one or more freed ranges of data, file system 102 or application 104 waits for a confirmation from storage stack 106 that those one or more freed ranges of data have been released by storage stack 106. This confirmation serves as an acknowledgment that the delete notification was passed down storage stack 106 to storage device 108 or 110, and that the filters 112 to which the delete notification was passed have been made aware of the delete notification. The last or bottom filter 112 (filter 112($x$)) generates the confirmation and returns the confirmation back up storage stack 106 to the one of file system 102 and application 104 from which the delete notification was received. File system 102 and application 104 do not re-use the one or more portions of the storage device on which the freed one or more ranges of data were stored until the confirmation that those one or more ranges of data have been released is received.

Which of file system 102 and application 104 a confirmation is returned to can be identified in different manners. In one or more embodiments, each delete notification includes an identifier of file system 102 or application 104, and when filter 112($x$) generates the confirmation corresponding to the delete notification it includes this identifier in the confirmation. In other embodiments, each delete notification has an identifier, and when filter 112($x$) generates the confirmation corresponding to the delete notification it includes this identifier in the confirmation. Filter 112(1) also maintains a record of which delete notification identifiers were received from file system 102 and which delete notification identifiers were received from application 104, and can readily determine based on the identifier in the confirmation which of file system 102 and application 104 the confirmation is to be returned. In still other embodiments, the confirmation includes an indication of the one or more ranges that were freed and these confirmations are returned to both file system 102 and application 104. File system 102 and application 104 can, in turn, determine which of the confirmations apply to ranges that they are managing.

Figure 2:
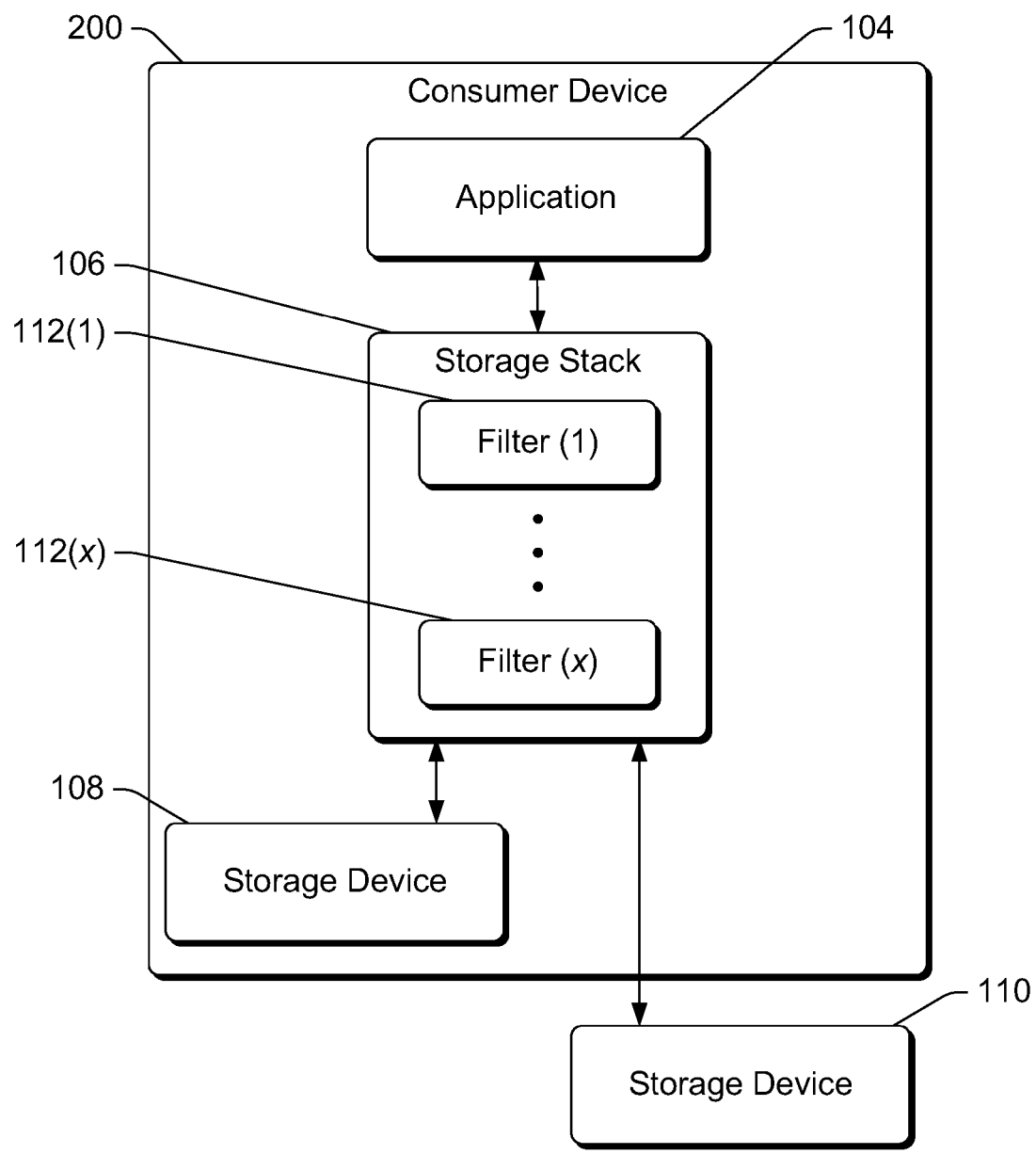
FIG. 2 is a block diagram illustrating another example consumer device implementing the use of delete notifications by file systems and applications to release storage space in accordance with one or more embodiments.

FIG. 2 is a block diagram illustrating another example consumer device 200 implementing the use of delete notifications by file systems and applications to release storage space in accordance with one or more embodiments. Consumer device 200 is similar to consumer device 100 of FIG. 1, with storage stack 106, and storage devices 108 and/or 110 operating as discussed above with respect to FIG. 1. However, no file system is included in consumer device 200, so application 104 interacts directly with storage stack 106. Application 104, in the absence of a file system on consumer device 200, interacts directly with storage stack to create, delete and/or modify files on storage devices 108 and/or 110 analogous to the discussion above regarding FIG. 1.

Figure 3:
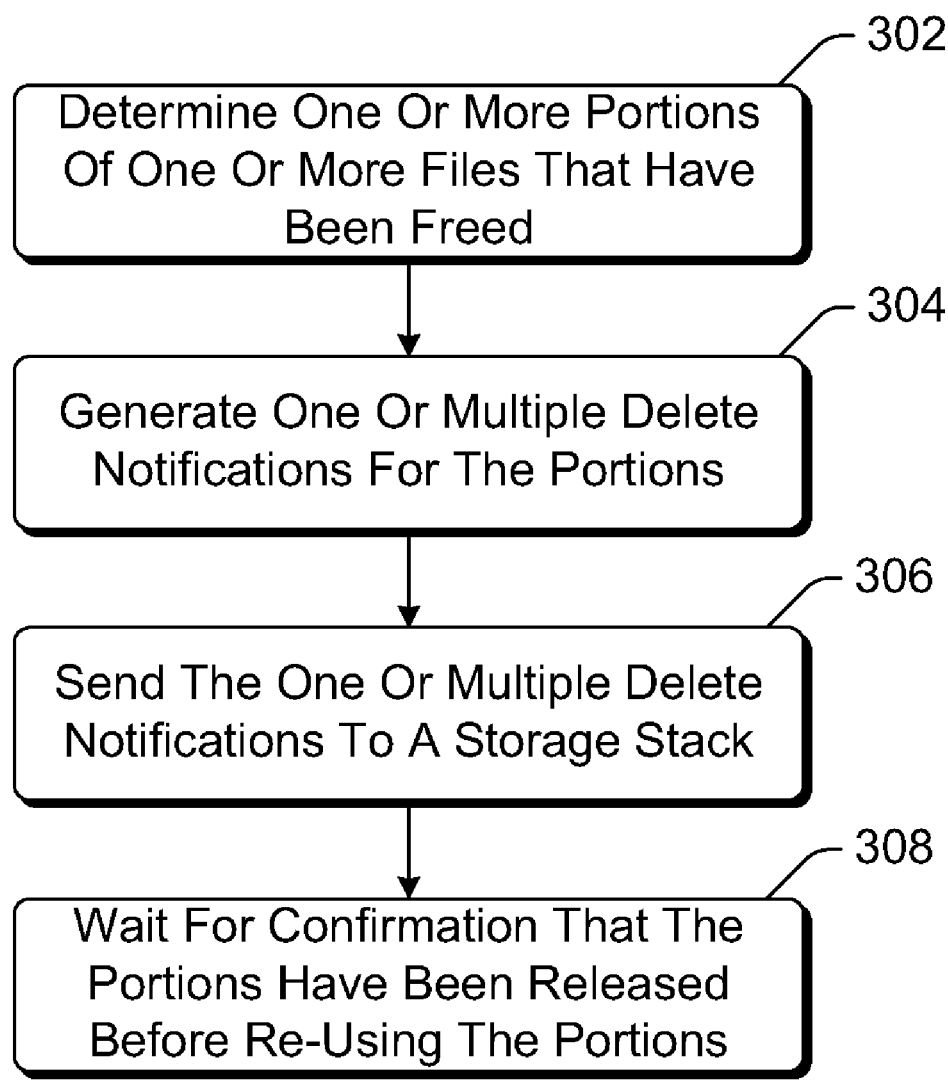
FIG. 3 is a flowchart illustrating an example process for a device implementing the use of delete notifications by file systems and applications to release storage space in accordance with one or more embodiments.

FIG. 3 is a flowchart illustrating an example process 300 for a device implementing the use of delete notifications by file systems and applications to release storage space in accordance with one or more embodiments. Process 300 is carried out by component or module of a device, such as file system 102 of FIG. 1, or an application 104 of FIG. 1 or FIG. 2, and can be implemented in software, firmware, hardware, or combinations thereof. Process 300 is an example process for the use of delete notifications by file systems and applications to release storage space; additional discussions of the use of delete notifications by file systems and applications to release storage space are included herein with reference to different figures.

In process 300, a determination is made that one or more portions of one or more files have been freed (act 302). These one or more portions that have been freed refer to one or more portions of the storage device that are no longer occupied by the one or more files (or by portions of the one or more files). The one or more portions of a file can be an entire file or part of a file. In one or more embodiments, the particular one or more portions that have been freed are identified by the component or module implementing process 300. For example, file system 102 can receive a user request to delete a file. As file system 102 manages the storage of that file, file system 102 can readily identify the one or more portions of the storage device that are no longer occupied by the file.

Alternatively, the particular one or more portions of the one or more files that have been freed can be identified by another component or module, which in turn informs the component or module implementing process 300 of the one or more portions. The one or more portions can be determined in a variety of different manners, such as by receiving an indication from a user or other component or module that a particular portion is no longer needed, that a particular file is no longer needed, and so forth.

Regardless of the component or module determining that a portion is to be freed, it is to be appreciated that such portion can be determined in a variety of different manners. For example, rules or algorithms can indicate that the portion is no longer to be used (e.g., due to the size of a file that includes the portion, the age of data in a file that includes the portion, and so forth), in response to a user request to delete a file or portion of the file, and so forth.

One or multiple delete notifications for the one or more portions determined in act 302 are generated (act 304). Each delete notification identifies one or more freed ranges of the storage device. Each of these freed ranges is a portion of the storage device that is no longer in use. It should be noted that a delete notification can identify multiple freed ranges.

Whether one or more multiple delete notifications are to be generated can be determined in a variety of different manners. For example, such a determination can be based on a frequency with which read and/or write requests are being sent to the storage stack (e.g., group multiple delete notifications together if read and/or write requests are being sent to the storage stack at greater than a threshold rate). By way of another example, such a determination can be based on a number of freed ranges of data identified in the delete notifications (e.g., group multiple delete notifications together until at least a threshold number of freed ranges are identified in the delete notifications). By way of yet another example, such a determination can be based on whether the delete notifications identify freed ranges of data in the same file (e.g., group multiple delete notifications together if the delete notifications identify freed ranges of data in the same file).

The one or multiple delete notifications generated in act 304 are sent to the storage stack (act 306). As discussed above, the determination of when the one or multiple delete notifications are to be sent can be made in a variety of different manners. Multiple delete notifications can be sent to the storage stack together in act 306, with each of these multiple delete notifications identifying one or more freed ranges.

The component or module implementing process 300 then waits for confirmation that the portions identified in the one or multiple delete notifications have been released before re-using the portions (act 308). This confirmation indicates that the storage stack has received and processed the delete notifications, and that the identified portions have been released by the storage stack and storage device.

FIGS. 4-9 illustrate an example delete notification system and environment in which the use of delete notifications by file systems and applications to release storage space can be used in accordance with one or more embodiments. FIGS. 4-9 illustrate an example storage stack having multiple example filters. It is to be appreciated that the example storage stack and filters discussed with reference to FIGS. 4-9 are merely examples, and that other storage stacks and/or filters can be used with the use of delete notifications by file systems and applications to release storage space discussed herein.

Figure 4:
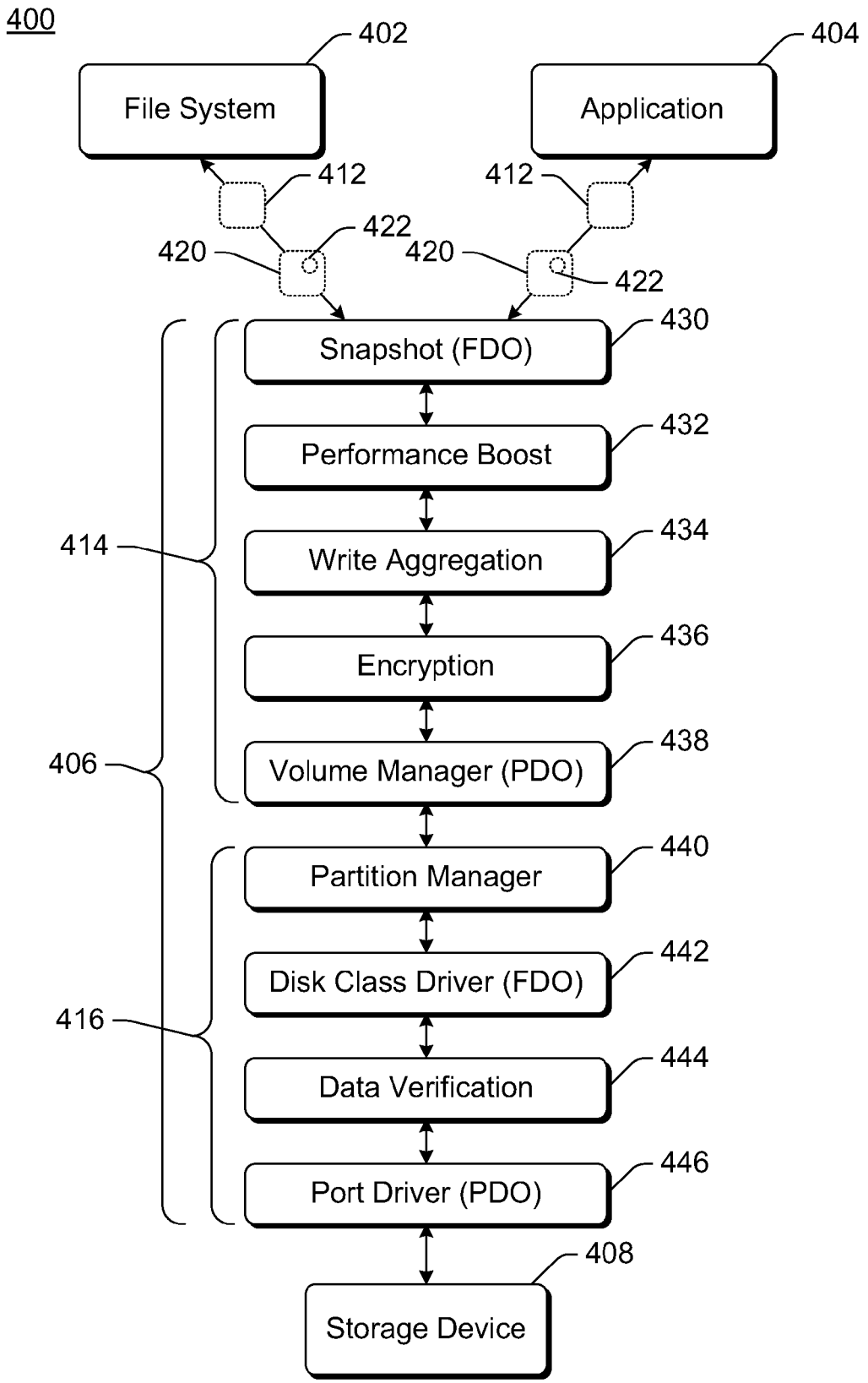
FIG. 4 is a block diagram of an example system implementing the use of delete notifications by file systems and applications to release storage space in accordance with one or more embodiments.

FIG. 4 is a block diagram of an example system 400 implementing the use of delete notifications by file systems and applications to release storage space in accordance with one or more embodiments. System 400 includes a file system 402, an application 404, a storage stack 406, and a storage device 408. File system 402 can be, for example, file system 102 of FIG. 1. Application 404 can be, for example, application 104 of FIG. 1. Storage stack 406 can be, for example, storage stack 106 of FIG. 1. Storage device 408 can be, for example, storage device 108 or 110 of FIG. 1. In the example system 400 of FIG. 4, storage stack 406 is illustrated as being separate from file system 402 and application 404. Alternatively, file system 402 and/or application 404 can be viewed as being part of the storage stack. Similarly, storage device 408 is illustrated as being separate from storage stack 406, although alternatively storage device 408 can be viewed as being part of the storage stack.

File system 402 and application 404 can each send read and/or write requests 412 to storage stack 406. Storage stack 406 can include a logical disk functionality that represents storage units to file system 402 and application 404 in terms of storage volumes, where each volume may represent a single storage device, part of one or more storage devices, or multiple storage devices. In such situations, storage stack 406 includes a volume stack 414 which can provide this functionality and can also provide additional functionality. A device stack 416 is positioned below volume stack 414, and represents storage positions to volume stack 414 in terms of positions within storage device 408.

Alternatively, storage stack 406 can be configured in other manners in other embodiments. For example, in one or more embodiments volumes coincide with storage devices, such as in a basic disk configuration. In such a configuration, storage stack 406 may not need to convert storage positions between volume space and device space. As another example, storage stack 406 could include program modules that are part of applications other than an operating system. Additionally, there could be one or many file systems, disk and/or volume stacks, and/or devices interacting with each other in storage stack 406.

As an example of how storage positions can be represented in the different layers of the storage stack 406, consider a situation where a 50-megabyte file is written to a storage device. File system 402 or application 404 can receive or generate a request to write the file. The file system 402 or application 404 can then determine an appropriate position in the volume to store the file. To do this, file system 402 or application 404 typically tracks occupied space that contains valid data, which file system 402 or application 404 may need to retrieve at some point. The file system 402 or application 404 also typically tracks free space that contains invalid data, where either no data has been stored by the operating system or where data has been deleted (i.e., de-allocated or freed) by the file system 402 or application 404. In one implementation, the file system 402 or application 404 can maintain a freespace bitmap file that can represent free space in a storage volume as 1's and occupied space in a storage volume as 0's. If megabytes 974 through 1024 of the volume are freespace in the freespace bitmap file, then the file system 402 or application 404 can pass a write request 412 down storage stack 406 with the data for the file to be written, specifying that the data-to-be-written is to be stored in megabytes 974 through 1024 of the volume. That request 412 can be passed down the volume stack 414 and the volume stack 414 can convert the request 412 from volume space to device space.

For example, if a volume spans two storage devices, including one gigabyte of a first device (megabytes 0 through 999 of the volume) and one gigabyte of a second device (megabytes 1000 through 1999), then volume stack 414 could split the request into two write requests: one to write the first 25 megabytes of the file on megabytes 975 to 999 of the first device and one to write the last 25 megabytes of the file on megabytes 0 to 24 of the second device. Those write requests can then be passed down device stack 416 to the storage devices. It is to be appreciated that the storage devices (e.g., storage device 408) can each include its own internal stack of software, firmware, and/or hardware components (such as additional storage stack filters) that can be part of the storage stack 406, and the storage devices can each include several physical storage mediums (e.g., multiple disks within a disk drive).

File system 402 or application 404 can "delete" a file by switching occupied space corresponding to the file to freespace, such as in the freespace bitmap. As discussed above, this deletion can be done without notifying storage device 408 or the other components of storage stack 406. However, a delete notification 420 can be sent down storage stack 406 when the file system 402 or application 404 deletes a file. As discussed above, the delete notification 420 can be an individual notification, or can be grouped together with one or more other delete notifications. This notification 420 can specify a region of the volume that the file system 402 or application 404 has deleted (e.g., switched to freespace). Storage device 408 can use this notification to provide improved internal performance and efficiencies, such as by ceasing to maintain the invalid data in the specified region.

The filters of storage stack 406 can also use such delete notifications to provide additional enhancements. Filters in storage stack 406 can modify delete notifications in a variety of manners, such as to exclude data being protected by those filters, to notify lower level storage stack components that data has been deleted (e.g., one or more portions of the storage device has been freed), and so forth. For example, a filter in storage stack 406 can receive a delete notification, modify the delete notification, and pass the modified delete notification to a next filter in storage stack 406. By way of another example, a filter in storage stack 406 can create a new delete notification. This new delete notification can be created directly by the filter or indirectly by the filter (e.g., by instructing some other software, firmware, and/or hardware component to create the new delete notification).

Referring back to FIG. 4, as another example of an enhancement using a delete notification, a filter of storage stack 406 can use delete notification 420 to identify storage resources that are not needed and can be released. As yet another example, the delete notification 420 can include a flag 422 indicating whether the notification 420 applies to an entire volume, and one or more of the filters of storage stack 406 can react differently to the notification 420 when the notification 420 applies to the entire volume.

Following is a discussion of some example filters of storage stack 406. As is indicated by the vertical lines with arrow tips between the filters in storage stack 406, each filter can be configured to communicate with the filter directly above it and directly below it in the storage stack 406. The filters can optionally include interfaces, such as user interfaces, to send and receive instructions and other communications between the filter and other software, firmware, and/or hardware modules or components inside or outside storage stack 406. In the illustrated example, volume stack 414 includes, from top to bottom, a snapshot filter 430 (below the file system 402 or application 404), a performance-boosting filter 432, a write aggregation filter 434, an encryption filter 436, and a volume manager filter 438. The device stack 416 includes, from top to bottom, a partition manager filter 440 (below the volume manager filter 438), a device stack functional device object referred to as disk class driver 442, a data verification filter 444, and port driver 446 (above the storage device 408). However, storage stack 406 could alternatively include fewer filters, additional filters, and/or filters that behave differently or are positioned elsewhere in storage stack 406.

Snapshot filter 430 manages volume snapshots, and can also function as a functional device object (FDO) for volume stack 414. Filters below the FDO but above a physical device object (PDO) in a stack are typically considered lower level filters, while filters above the FDO in a stack are typically considered upper level filters. The FDO refers to a filter that represents a device (e.g., storage device 408 in FIG. 4) to a driver or module that provides the operation interface for the device (e.g., to file system 402, application 404, or partition manager 440 in FIG. 4). The PDO refers to a filter at the bottom of a stack that represents a device (e.g., storage device 408 in FIG. 4) to another stack or device (e.g., to device stack 416 or storage device 408 in FIG. 4). Managing volume snapshots can include taking snapshots of a storage volume at a particular point in time. This allows users and/or programs to go back in time to the storage volume as the volume existed when the snapshot was taken.

Figure 5:
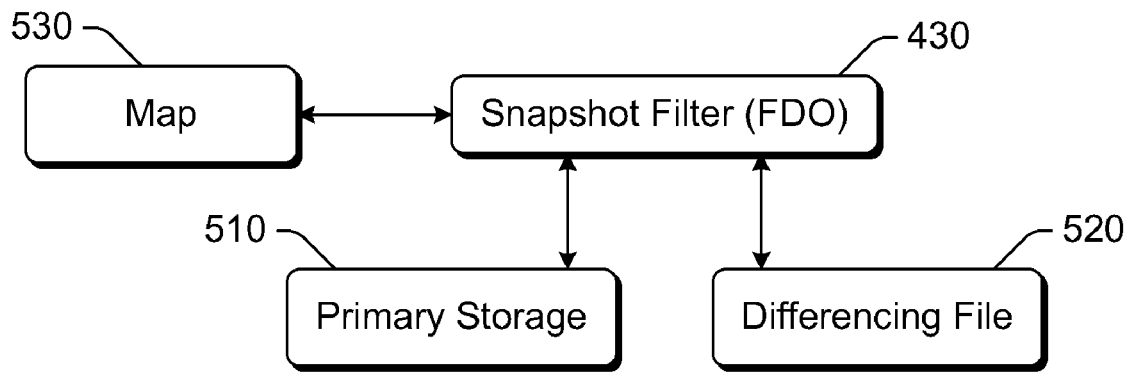
FIG. 5 is a block diagram illustrating operation of an example snapshot filter in accordance with one or more embodiments.

Managing snapshots can be done by making a copy of an entire volume at a point in time and not allowing any modifications to that copy. Referring to FIGS. 4 and 5, it is typically more efficient to maintain snapshots by only copying those regions of a primary storage volume 510 where changes have taken place since the time of the snapshot. These copies of the modified regions can be saved in one or more differencing files 520. According to this technique, if a region of primary data that is subject to a snapshot has not yet been copied, then such a region and the primary data stored in the region can be protected by snapshot filter 430.

If snapshot filter 430 receives a write request from the file system 402 or application 404 to write data to a protected region, then snapshot filter 430 can copy the data in the protected region of the primary storage 510 to the differencing file 520. Then, the data in the primary storage 510 region can be marked as unprotected, and snapshot filter 430 can pass the write request down the storage stack 406. Thus, snapshot filter 430 can maintain a copy of the data for an entire volume as the volume existed at the time of the snapshot, with some of the data being stored with the primary data (where the primary data has not been altered since the time of the snapshot) and some of the copy being stored in one or more differencing files (where the primary data has been altered since the time of the snapshot).

As noted, snapshot filter 430 can include one or more maps 530 to track which regions of the primary storage 510 are protected (because the regions are covered by a snapshot and have not yet been copied to a differencing file) and which are unprotected (because the regions are not covered by a snapshot or have been copied to a differencing file). For example, for each snapshot, the snapshot filter 430 can maintain a bitmap 530 showing which regions are protected or unprotected by that snapshot, such as with 1's representing unprotected regions and 0's representing protected regions for that snapshot. These bitmaps 530 can be examined to determine whether a region is protected and is to be copied prior to data being written to the region.

When snapshot filter 430 receives a delete notification 420, the snapshot filter 430 determines whether a range of data that the delete notification indicates is being deleted overlaps with a range of protected primary data. If there is an overlap, then snapshot filter 430 copies the protected primary data to differencing file 520 prior to passing the delete notification 420 down storage stack 406. However, the copied data in the differencing file 520 takes up storage space, and the copy operation can also take up storage resources, including processing resources.

Accordingly, instead of copying the protected data that overlaps with the range of the delete notification 420, snapshot filter 430 can modify the range of the existing delete notification 420 to exclude the portion of the range that overlaps with the protected data range. This can result in the modified delete notification having one contiguous contracted range or a contracted range that includes disconnected sub-ranges. The modified delete notification can be in the form of a single notification or multiple notifications. The modified delete notification with the contracted range can then be passed down storage stack 406 to the performance-boosting filter 432.

For example, if the received delete notification 420 applies to a range of 100 megabytes to 200 megabytes of a volume, and a range of 50 megabytes to 150 megabytes of the volume is protected, then snapshot filter 430 can modify the delete notification 420 to have a contracted range of 151 megabytes to 200 megabytes. As another example, if the received delete notification 420 applies to a range of 100 megabytes to 200 megabytes of a volume, and ranges of 120 to 145 megabytes and from 160 to 165 megabytes of the volume are protected, then snapshot filter 430 can modify the delete notification 420 to have a contracted range including sub-ranges of 100 to 119 megabytes, from 146 to 159 megabytes, and from 166 to 200 megabytes. The entire contracted range could be included in a single modified delete notification with sub-ranges or each sub-range could be included in a separate modified delete notification.

The modified delete notification(s) can be passed down the storage stack 406 to the performance-boosting filter 432. Thus, the protected data will not be modified in response to the delete notification 420, and the protected data will not need to be copied at that time. Similar techniques could be used by other storage stack filters that protect data that can be covered by a delete notification 420.

Snapshots can be deleted in some implementations, and can be deleted manually by a user or automatically. For example, a user can configure snapshot filter 430 so that the snapshot data (secondary data corresponding to the primary data at the time of the snapshot, such as the data in one or more differencing files 520) takes up only a certain percentage of the storage volume. If a user specifies a maximum of fifteen percent, then as the amount of snapshot data approaches fifteen percent of the storage volume, snapshot filter 430 can delete snapshots according to a scheme, such as deleting the oldest snapshots. At that time, snapshot filter 430 can inform file system 402 or application 404 that one or more differencing files 520 that were used only by the deleted snapshots contain invalid data and can be deleted. In response, the file system 402 or application 404 can mark the storage regions of those one or more differencing files 520 as invalid data and send delete notifications for those regions down the storage stack 406.

In addition, when a snapshot is deleted, snapshot filter 430 can issue additional delete notifications for primary storage 510 regions that the snapshot filter 430 had omitted from previous delete notifications 420 because the notifications 420 indicated delete regions that overlapped with protected regions being protected by the snapshot filter 430. If those regions are no longer protected after the snapshot is deleted, then the snapshot filter 430 can send down the delete notifications for those regions. This can free up storage resources in the same manner as other delete notifications issued by file system 402 or application 404.

Snapshot filter 430 can identify these regions by tracking all regions where delete notifications 420 were withheld or modified by snapshot filter 430 because the notifications 420 indicated ranges that overlapped with protected data. Alternatively, snapshot filter 430 can compute regions that can be deleted in other manners without tracking those regions. When a snapshot is deleted, snapshot filter 430 can calculate the product of all the bitmaps 530 that track unprotected areas for active snapshots after the snapshot deletion. This produces an ignorable product bitmap that shows all storage regions that are unprotected by snapshot filter 430 after the snapshot deletion, such as by having 1's for those regions. Snapshot filter 430 can also take the product of that ignorable product bitmap and the freespace bitmap discussed above to produce a bitmap that shows areas that are considered freespace by the file system 402 or application 404 and are unprotected by the snapshot filter 430, such as by having 1's corresponding to such areas. Snapshot filter 430 can create new delete notifications for all such areas and pass the new delete notifications down storage stack 406 to performance-boosting filter 432.

If snapshot filter 430 receives a delete notification 420 with a flag 422 indicating that the delete notification 420 applies to the entire volume, then snapshot filter 430 can react differently than it would to a delete notification 420 that applies to less than the entire volume. For example, if snapshot filter 430 receives a delete notification 420 with a flag 422 indicating that the delete notification 420 applies to the entire volume, then snapshot filter 430 can delete all snapshots for the volume, and snapshot filter 430 can disable itself. Snapshot filter 430 can continue to be disabled until it is re-enabled, such as by a user or another component or module. For example, snapshot filter 430 can be re-enabled the next time a snapshot is created automatically or in response to user input.

Figure 6:
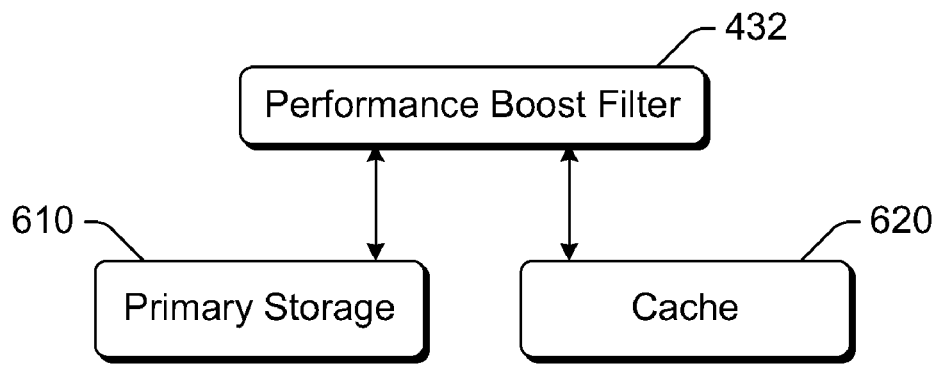
FIG. 6 is a block diagram illustrating operation of an example performance-boosting filter in accordance with one or more embodiments.

Referring to FIGS. 4 and 6, performance-boosting filter 432 can communicate with snapshot filter 430 above it and write aggregation filter 434 below it to receive and pass on delete notifications 420 and read/write requests and data 412. In addition, the performance boosting filter can copy parts of a primary storage 610 region into a cache 620 on some other media that is faster than the primary storage device (e.g., the other media can be RAM, a USB drive, or flash media if the primary storage volume is on one or more hard disks). The data can be read from the cache 620 instead of primary storage 610 to enhance system performance. For example, the stored data can be instructions that are used when booting a computer system, thereby speeding the boot process.

The performance-boosting filter 432 can pass on delete notifications 420 without taking other actions. If a delete notification 420 applies to a region of primary storage 610 that corresponds to the cache 620, then the cache 620 can get out of synchronization with the primary data. Such situations would likely not affect the integrity of the cache data because there would be no reason for the cache data corresponding to the deleted primary data to be read in the future. However, space in the cache 620 is often limited. For example, in some implementations the cache 620 can be limited to about 300 megabytes. Accordingly, performance-boosting filter 432 can optionally determine whether data in the cache 620 corresponds to data in primary storage 610 covered by a delete notification 420, and if so then performance-boosting filter 432 can delete the corresponding cache data. This can include the performance-boosting filter 432 marking the deleted region of the cache as invalid so that more cached data can be stored in the region.

If performance-boosting filter 432 receives a delete notification 420 with a flag 422 indicating that the delete notification 420 applies to the entire volume, then performance-boosting filter 432 can react differently than it would to a delete notification 420 that applies to less than the entire volume. For example, if the performance-boosting filter 432 receives a delete notification 420 with a flag 422 indicating that the delete notification 420 applies to the entire volume, performance-boosting filter 432 can disable itself, or it can remain enabled, but start caching operations from scratch. If performance-boosting filter 432 is disabled, it can remain disabled for a set period of time or until it is re-enabled by an action of another program and/or user input.

Figure 7:
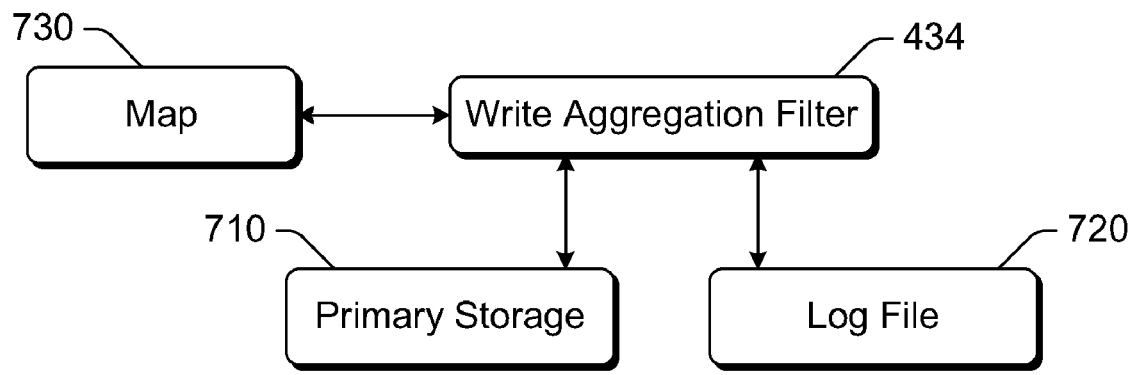
FIG. 7 is a block diagram illustrating operation of an example write aggregation filter in accordance with one or more embodiments.

Referring to FIGS. 4 and 7, write aggregation filter 434 can communicate with performance-boosting filter 432 above it and encryption filter 436 below it to receive and pass on delete notifications 420 and read/write requests and data 412. In addition, write aggregation filter 434 can provide the additional functionality of managing write aggregation and lazy writes of aggregated write requests. When data is written to primary storage 710 on storage device 408, the write operation may involve making updates in several different primary data locations in the volume. Instead of writing data-to-be written to the primary storage locations at the time the requests are made, write aggregation filter 434 can write the data-to-be-written to one or more log files 720. Write aggregation filter 434 can also update an in-memory map 730, which can be a table that correlates the primary locations of the data-to-be-written with the positions of the data to-be-written in log file 720. Log file 720 can be stored in the same volume as primary storage 710 or alternatively elsewhere. The data-to-be-written can be drained from log file 720 to the primary location(s) in primary storage 710 in lazy write operations, which can be done at idle times, when storage device 408 would otherwise be idle. In-memory map 730 can be examined to determine which drain operations still need to be done. After data is drained from log file 720, entries in the in-memory map 730 that correspond to the drained data can be removed.

If read requests for locations of the data-to-be-written in primary storage 710 come down storage stack 406 before the data-to-be-written is drained from log file 720, write aggregation filter 434 can use in-memory map 730 to redirect the requests to the appropriate places in log file 720. After the data-to-be-written is drained to its primary locations in primary storage 710, write aggregation filter 434 can allow read requests for that data to be passed down the stack unmodified.

In one or more embodiments, log file 720 is a circular file and a storage region is allocated for log file 720. Data-to-be-written is added to log file 720, which moves through the storage region as data-to-be-written is added to and drained from log file 720. Specifically, data-to-be written can be added to a "head" of log file 720 when write requests are made during busy times, and the data-to-be-written can be drained from a "tail" of log file 720 when lazy writes are made, such as at idle times. When the head reaches the end of the storage region, data can continue to be written at the beginning of the storage region, so long as the beginning has been drained. In this way, log file 720 can travel a "circular" path through the storage region. As data is added to the head or drained from the tail, the in-memory map 730 can be updated.

If write aggregation filter 434 receives a delete notification 420, write aggregation filter 434 checks in-memory map 730 to determine whether the regions of primary storage 710 covered by the delete notification 420 overlap with the primary locations of any corresponding data-to-be-written that is stored in log file 720. If so, then those areas can be trimmed from the in-memory map 730, so that areas associated with the delete notification 420 will not be drained to the primary storage 710, and storage resources (storage device, processors that can be used for storage operations, etc.) can be freed for other uses.

In addition, write aggregation filter 434 can create new delete notifications that cover unused areas 812 of the log file storage region. For example, if the unused area expands to include an additional unused storage area, write aggregation filter 434 can issue a delete notification covering the additional unused storage area. It should be noted that the file system 402 or application 404 may still view the unused storage area as containing valid data because the unused storage area is in the storage region that has been allocated for use by write aggregation filter 434. Thus, a storage device 408, such as a flash memory device, can prepare this additional unused storage area for writing and can cease maintaining data that is stored in the additional unused storage area.

Referring to FIGS. 4, 5, and 7, write aggregation filter 434 can have a handshake operation with snapshot filter 430. In this handshake, snapshot filter 430 can request that write aggregation filter 434 copy data from a protected primary storage 510 area to a differencing file 520. Instead of sending this request down storage stack 406, write aggregation filter 434 can notify snapshot filter 430 that the copy operation was completed successfully. Write aggregation filter 434 can add the location in primary storage 510 and the location in differencing file 520 to the write aggregation filter's in-memory map 730. Write aggregation filter 434 can then redirect any read requests for the differencing file location to the primary storage area location, using in-memory map 730. If this is done, write aggregation filter 434 can protect the data by modifying delete notifications to remove areas that overlap with copy protected areas that have not yet been copied. This can be done in a manner that is similar to the delete notification modifications done by snapshot filter 430 to protect data, as discussed above.

If write aggregation filter 434 receives a delete notification 420 with a flag 422 indicating that the delete notification 420 applies to the entire volume, then write aggregation filter 434 can react differently than it would to a delete notification 420 that applies to less than the entire volume. For example, if write aggregation filter 434 receives a delete notification 420 with a flag 422 indicating that the delete notification 420 applies to the entire volume, write aggregation filter 434 can disable itself; or the write aggregation filter 434 can remain enabled, but cancel all ongoing draining operations and delete log file 720. If write aggregation filter 434 is disabled, it may remain disabled for a set period of time or until it is re-enabled by an action of another program and/or user input.

Referring to FIG. 4, encryption filter 436 can communicate with write aggregation filter 434 above it and volume manager filter 438 below it to receive and pass on delete notifications 420 and read/write requests and data 412. Encryption filter 436 can also perform additional functions, such as encrypting an entire volume. In one or more embodiments, the encryption technique employed by encryption filter 436 is the BitLocker™ drive encryption technique available from Microsoft Corporation of Redmond, Wash. Alternatively, other public and/or proprietary encryption techniques can be employed by encryption filter 436.

If encryption filter 436 receives a delete notification 420 with a flag 422 indicating that delete notification 420 applies to the entire volume, then the encryption filter 436 can react differently than it would to a delete notification 420 that applies to less than the entire volume. For example, if the encryption filter 436 receives a delete notification 420 with a flag 422 indicating that the delete notification 420 applies to the entire volume, encryption filter 436 can disable itself; or encryption filter 436 can remain enabled, but cancel all ongoing encryption operations. If encryption filter 436 is disabled, it may remain disabled for a set period of time or until it is re-enabled by an action of another program and/or user input.

Volume manager filter 438 can communicate with encryption filter 436 above it and partition manager filter 440 in device stack 416 below it to receive and pass on delete notifications 420 and read/write requests and data 412. Volume manager filter 438 can communicate with the appropriate one or more device stacks 416 involved in the configuration, whether there are one or several such device stacks. In addition, volume manager filter 438 can be the PDO for volume stack 414. Before passing on delete notifications 420, volume manager filter 438 can convert read/write requests 412 and delete notifications 420 between volume space and device space.

For example, in a striping configuration, megabytes 0 to 99 of a volume may correspond to megabytes 0 to 99 of a first storage device; megabytes 100 to 199 of the volume may correspond to megabytes 0 to 99 of a second storage device; megabytes 200 to 299 of the volume may correspond to 100 to 199 megabytes of the first device; megabytes 300 to 399 of the volume may correspond to megabytes 100 to 199 of the second storage device, and so forth. In this example, volume manager filter 438 can split a delete notification that applies to megabytes 49 to 150 of the volume into one delete notification that applies to megabytes 49 to 99 of the first storage device and another delete notification that applies to megabytes 0 to 50 of the second storage device. Similar conversions can be done for other configurations, such as where a volume spans multiple storage devices, or where a volume takes up only part of a storage device. This conversion between volume and storage device space (i.e., from volume-relative range(s) to device-relative range(s)) is an example of modifying the delete notifications 420. As an example of this type of modification, consider a disk (0 to 99 megabytes) with two volumes on it, where volume 1 resides from 1 to 24 megabytes and volume 2 resides from 25 to 99 megabytes. If volume manager filter 438 receives a delete notification for range 10 to 14 megabytes on volume 1, filter 438 can adjust that range to 11 to 15 megabytes, and if volume manager filter 438 receives the same delete notification on volume 2 (a notification for 10 to 14 megabytes on volume 2), filter 438 can adjust that range to 35 to 39 megabytes.

Figure 8:
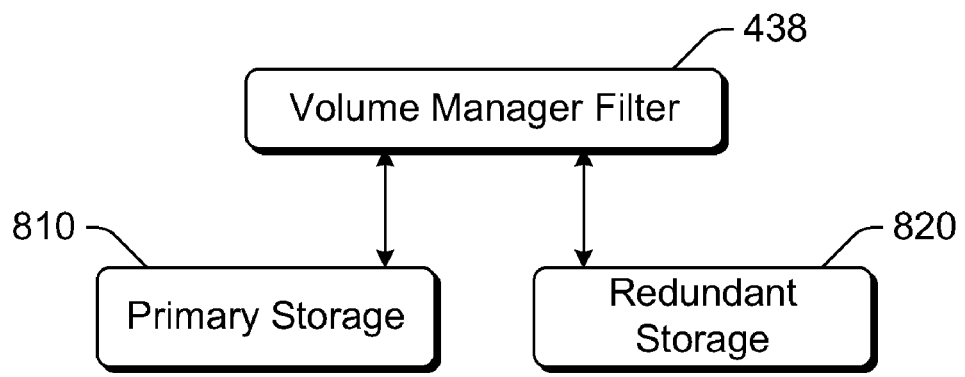
FIG. 8 is a block diagram illustrating operation of an example volume manager filter in accordance with one or more embodiments.

Referring to FIG. 8, in many fault-tolerant volume storage configurations, in addition to maintaining a primary storage volume 810, volume manager filter 438 can maintain redundant storage 820, which can be used to recreate part or all of primary storage volume 810 in the case of storage device failure. For example, this can be done with some types of redundant arrays of independent disks (RAID), such as mirroring or RAID 5. In the case of mirroring, redundant storage 820 includes a copy (mirror image) of primary storage volume 810. Redundant storage 820 can be created and maintained on one or more separate storage devices. In the case of RAID 5, at least three "flexes" can be used, where a plex is typically a set of one or more storage devices. One of the plexes (redundant storage 820) can be an XOR of the other plexes (primary storage 810). If one of the primary storage plexes crashes, the plex can be recreated using the remaining primary storage plexes and the redundant XOR plex.

Redundant storage 820, such as a RAID 5 XOR plex or a mirror image, sometimes needs to be synchronized with primary storage volume 810. For example, synchronization is typically done when a RAID 5 XOR plex or a mirror image is first created, or after system failure, such as a dirty shutdown. Synchronization can involve volume manager filter 438 examining primary storage volume 810, comparing primary storage volume 810 to redundant storage 820, performing any appropriate calculations, and writing any appropriate data to synchronize redundant storage 820 with primary storage 810. With mirroring synchronization can include performing a series of read and copy operations; and with RAID 5, synchronization can include read and write operations, as well as XOR calculations.

Referring to FIGS. 4 and 8, when volume manager filter 438 is performing a synchronization operation with primary storage 810 and redundant storage 820, volume manager filter 438 can omit from its synchronization operations those areas of primary storage 810 that have been covered by delete notifications 420, unless subsequent write operations have been executed in those areas. This can be done whether the delete notifications 420 are received before the synchronization operation begins, or even while the synchronization operation is ongoing. By foregoing some of these synchronization operations, storage resources can be freed.

In addition, volume manager filter 438 can modify a received delete notification 420 by expanding a range of data covered by the received delete notification 420 to cover not only the data in primary storage 810 indicated by the received delete notification 420, but also corresponding data in redundant storage 820.

If volume manager filter 438 receives a delete notification 420 with a flag 422 indicating that the delete notification 420 applies to the entire volume, then volume manager filter 438 can react differently than it would to a delete notification 420 that applies to less than the entire volume. For example, if volume manager filter 438 receives a delete notification 420 with a flag 422 indicating that the delete notification 420 applies to the entire volume, volume manager filter 438 can remain enabled, but cancel all ongoing synchronization operations. When volume manager filter 438 receives an existing delete notification 420 that applies to the entire storage volume, and this is indicated by a flag 422, volume manager filter 438 can modify the delete notification 420 by replacing the flag 422 with one or more delete notifications for one or more device-relative ranges that span the entire volume before passing the modified delete notification(s) down the storage stack 406.

Referring to FIG. 4, partition manager filter 440 can communicate with volume manager filter 438 above it and disk class driver 442 below it to receive and pass on delete notifications 420 and read/write requests and data 412. Thus, partition manager filter 440 can be the upper-most filter in device stack 416. In addition, partition manager filter 440 can manage the partitions for the associated storage device 408. If it is desired to remove the partitions on the associated storage device 408, partition manager filter 440 can create a new delete notification that applies to the entire storage device 408 and pass the new delete notification down disk stack 416 to disk class driver 442.

Disk class driver 442 can communicate with partition manager filter 440 above it and data verification filter 444 below it to receive and pass on delete notifications 420, as well as read/write requests and data 412. Disk class driver 442 can also be the FDO for device stack 416. If disk class driver 442 receives a delete notification that applies to the entire storage device 408, then disk class driver 442 can treat that delete notification the same as other delete notifications because the disk class driver's operations do not involve caching or transforming data.

Figure 9:
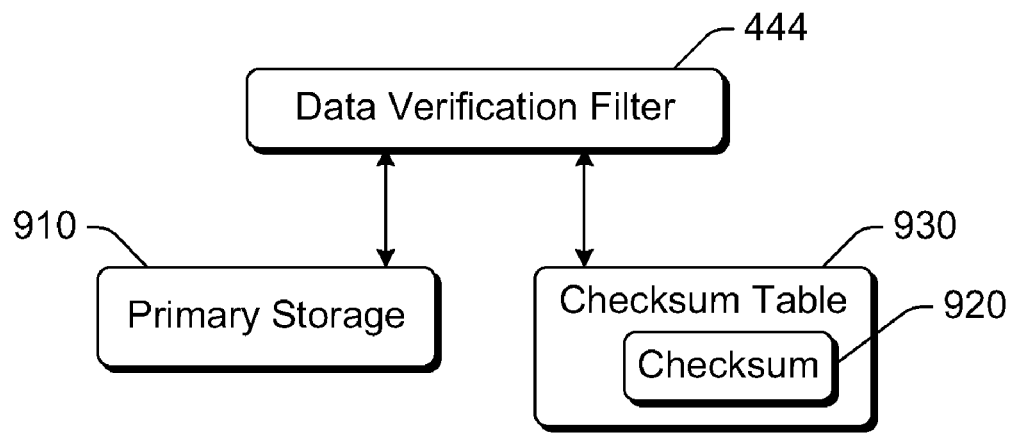
FIG. 9 is a block diagram illustrating operation of an example data verification filter in accordance with one or more embodiments.

Referring now to FIGS. 4 and 9, data verification filter 444 can communicate with disk class driver 442 above it and port driver 446 below it to receive and pass on delete notifications 420 and read/write requests and data 412. Data verification filter 444 can perform calculations on a block of data to be written to primary storage 910, and produce and store a checksum 920 (e.g., a cyclical redundancy check (CRC) or other checksum) from that data. The checksums 920 can be used as checksums to detect accidental alteration of data by the storage device 408. The checksums 920 can be stored in a checksum table 930, which can be stored in memory, such as RAM, or in some other storage area. When the primary data is later read from primary storage 910, data verification filter 444 can calculate the checksum of the data received from storage device 408 and compare that new checksum to the corresponding checksum 920 stored in memory. If the stored and new checksums match, then the data is verified. If the stored and new checksums do not match, then data verification filter 444 can indicate that the data received from storage device 408 is invalid.

Data verification filter 444 can pass on delete notifications 420 without taking other actions. If a delete notification 420 applies to a region of primary storage 910 that corresponds to stored checksums 920, then the stored checksums 920 can get out of synchronization with the primary data. Such situations would likely not affect the integrity of the checksums 920 because there would be no reason for the checksums 920 corresponding to the deleted primary data to be read in the future. However, space in checksum table 930 is often limited. For example, in some implementations checksum table 930 may be limited to a small percentage or fixed amount of available RAM space. Accordingly, data verification filter 444 can optionally determine whether checksums 920 in the checksum table 930 correspond to data in primary storage 910 covered by a delete notification 420, and if so data verification filter 444 can delete the corresponding checksums 920.

If data verification filter 444 receives a delete notification 420 that applies to the entire storage device 408, then data verification filter 444 can cancel ongoing operations, throw away all checksums for storage device 408, and start operating from scratch.

Port driver 446 can communicate with data verification filter 444 above it and storage device 408 below it to receive and pass on delete notifications 420 and read/write requests and data 412. This communication with storage device 408 can be done using an existing or new protocol, such as by having a delete notification function in the existing ATA protocol. If a delete notification 420 is for a range that is greater than a maximum range that can be represented in a single delete notification protocol command, port driver 446 can issue multiple delete notification protocol commands with adjacent ranges. If port driver 446 receives a delete notification that applies to the entire storage device 408, then port driver 446 can treat that delete notification the same as other delete notifications because the port driver's operations do not involve caching or transforming data. If the protocol to communicate with storage device 408 does not include the ability to indicate that a delete notification 420 applies to the entire range of storage device 408 (for example, with a flag), then port driver 446 can modify the existing delete notification 420 that applies to the entire device 408 by generating one or more delete notifications 420 with one or more adjacent ranges that describe the entire range of storage device 408.

After port driver 446 issues the appropriate delete notification protocol command or commands to storage device 408, port driver 446 returns a confirmation for the delete notification to data verification filter 444. This confirmation is then passed back up stack 406 to the one of file system 402 and application 404 from which the delete notification was received. Alternatively, port driver 446 can wait to return the confirmation until after port driver 446 has received a notification from storage device 408 that storage device 408 has received or otherwise acknowledged the delete notification protocol command or commands.

Figure 10:
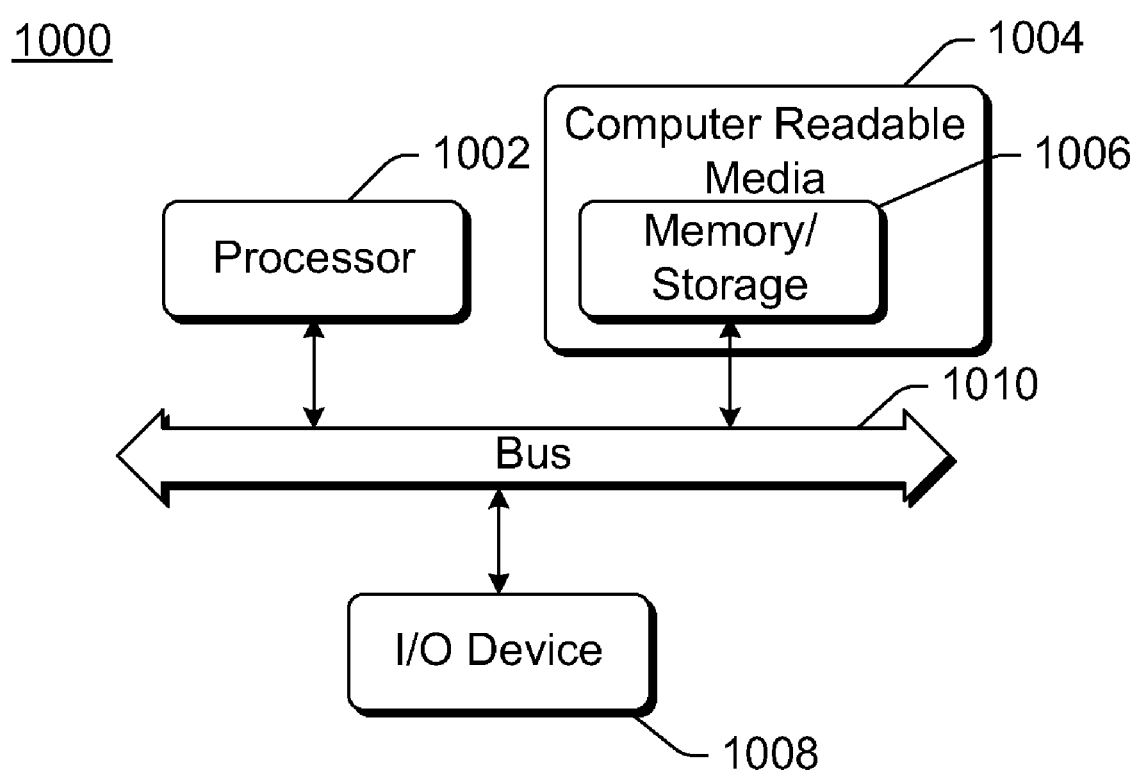
FIG. 10 illustrates an example computing device that can be configured to implement the use of delete notifications by file systems and applications to release storage space in accordance with one or more embodiments.

FIG. 10 illustrates an example computing device 1000 that can be configured to implement the use of delete notifications by file systems and applications to release storage space in accordance with one or more embodiments. Computing device 1000 can be, for example, consumer device 100 of FIG. 1 or FIG. 2.

Computing device 1000 includes one or more processors or processing units 1002, one or more computer readable media 1004 which can include one or more memory and/or storage components 1006, one or more input/output (I/O) devices 1008, and a bus 1010 that allows the various components and devices to communicate with one another. Computer readable media 1004 and/or one or more I/O devices 1008 can be included as part of, or alternatively may be coupled to, computing device 1000. Bus 1010 represents one or more of several types of bus structures, including a memory bus or memory controller, a peripheral bus, an accelerated graphics port, a processor or local bus, and so forth using a variety of different bus architectures. Bus 1010 can include wired and/or wireless buses.

Memory/storage component 1006 represents one or more computer storage media. Component 1006 can include volatile media (such as random access memory (RAM)) and/or nonvolatile media (such as read only memory (ROM), Flash memory, optical disks, magnetic disks, and so forth). Component 1006 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 1002. It is to be appreciated that different instructions can be stored in different components of computing device 1000, such as in a processing unit 1002, in various cache memories of a processing unit 1002, in other cache memories of device 1000 (not shown), on other computer readable media, and so forth. Additionally, it is to be appreciated that the location where instructions are stored in computing device 1000 can change over time.

One or more input/output devices 1008 allow a user to enter commands and information to computing device 1000, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 10. The features of the use of delete notifications by file systems and applications to release storage space techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented in a device, the method comprising:
    determining, for each of multiple files, that one or more portions of the file have been freed;
    generating one or more delete notifications identifying the one or more portions of the multiple files, each portion being identified as a range of data on a storage device, and each delete notification including one or more ranges of data on the storage device;
    determining when the generated one or more delete notifications are to be sent to a storage stack based on one or more threshold-based criteria, the one or more threshold-based criteria including a frequency with which read and/or write requests are being sent to the storage stack; and
    sending the generated one or more delete notifications to the storage stack.

2. A method as recited in claim 1, wherein the one or more portions of the file comprise the entire file.

3. A method as recited in claim 1, wherein the one or more ranges of data on the storage device are identified by an offset value and a length value.

4. A method as recited in claim 1, further comprising waiting for confirmation from the storage stack that the one or more ranges of data on the storage device have been released before re-using the one or more portions.

5. A method as recited in claim 1, further comprising:
    for each of the one or more delete notifications, flushing metadata corresponding to the one or more ranges of data prior to sending the delete notification to the storage stack.

6. A method as recited in claim 4, further comprising receiving confirmations for the multiple delete notifications individually.

7. A method as recited in claim 1, wherein the method is implemented in a file system of the device.

8. A method as recited in claim 1, wherein the method is implemented in an application that manages storage via the storage stack in the absence of a file system of the device.

9. A method as recited in claim 1, wherein the storage stack includes multiple filters, and each of the multiple filters can receive the one or more delete notifications, process the one or more delete notifications, and pass the one or more delete notifications to a next one of the multiple filters or to the storage device.

10. One or more computer storage media having stored thereon multiple instructions that, when executed by one or more processors of a device, cause the one or more processors to:
    determine one or more ranges of data of a storage device that are to be freed;
    determine, using one or more threshold-based criteria, when to send, in the absence of a file system on the device, to a storage stack a delete notification identifying the one or more ranges of data of the storage device that are to be freed, the one or more threshold-based criteria including a period of inactivity or low usage of the storage device; and
    send the delete notification to the storage stack.

11. One or more computer storage media as recited in claim 10, the one or more ranges of data of the storage device comprising an entire file.

12. One or more computer storage media as recited in claim 10, the one or more ranges of data being identified by one or more beginning offset values and one or more ending offset values.

13. One or more computer storage media as recited in claim 10, the one or more ranges of data being identified by one or more offset values and one or more length values.

14. One or more computer storage media as recited in claim 10, wherein the multiple instructions comprise a program that manages storage via the storage stack in the absence of the file system of the device.

15. One or more computer storage media as recited in claim 10, wherein the instructions further cause the one or more processors to group together the delete notification with one or more additional delete notifications, and send the grouped together delete notifications together to the storage stack.

16. One or more computer storage media as recited in claim 10, wherein the instructions further cause the one or more processors to wait for confirmation from the storage stack that the one or more ranges of data have been released before re-using the one or more portions.

17. One or more computer storage media as recited in claim 10, wherein to send the delete notification is to invoke a delete method of an application programming interface exposed by the storage stack.

18. One or more computer storage media as recited in claim 17, wherein the delete method includes an offset value parameter and a length value parameter via which the one or more ranges of data are identified.

19. One or more computer storage media as recited in claim 10, wherein the storage stack includes multiple filters, and each of the multiple filters can receive the delete notification, process the delete notification, and pass the delete notification to a next one of the multiple filters or to a storage device.

20. A method, implemented by a program in a consumer device, the method comprising:
   determining that one or more portions of a file are to be freed;
   generating a delete notification including one or more ranges of data, each range of data comprising an offset value and a length value that identifies one of the one or more portions;
   sending, in the absence of a file system on the device, the one or more delete notifications to a storage stack by invoking a delete method of an application programming interface;
   in an event that the delete notification includes a range of data that corresponds to multiple storage devices or multiple volumes of storage space on a storage device, splitting the delete notification into a number of delete notifications that each correspond to a particular range of data that applies to a single respective storage device or a single respective volume; and
   waiting for confirmation from the storage stack that the one or more ranges of data have been released before re-using the one or more portions.

* * * * *